(12) United States Patent
Yang et al.

(10) Patent No.: US 12,181,925 B2
(45) Date of Patent: Dec. 31, 2024

(54) DISPLAY MODULE AND MOBILE TERMINAL

(71) Applicant: WUHAN CHINA STAR OPTOELECTRONICS SEMICONDUCTOR DISPLAY TECHNOLOGY CO., LTD., Hubei (CN)

(72) Inventors: Zhenyu Yang, Hubei (CN); Dengqian Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 256 days.

(21) Appl. No.: 17/624,856

(22) PCT Filed: Dec. 29, 2021

(86) PCT No.: PCT/CN2021/142362
§ 371 (c)(1),
(2) Date: Jan. 5, 2022

(87) PCT Pub. No.: WO2023/115620
PCT Pub. Date: Jun. 29, 2023

(65) Prior Publication Data
US 2023/0195173 A1    Jun. 22, 2023

(30) Foreign Application Priority Data

Dec. 22, 2021 (CN) .................... 202111581079.8

(51) Int. Cl.
*G06F 1/16* (2006.01)

(52) U.S. Cl.
CPC .......... *G06F 1/1656* (2013.01); *G06F 1/1652* (2013.01)

(58) Field of Classification Search
None
See application file for complete search history.

(56) References Cited

U.S. PATENT DOCUMENTS 11,353,929 B2 *  6/2022  Zhu .................... G06F 1/1652
11,598,983 B2 *  3/2023  Lee .................... H10K 59/50
(Continued)

FOREIGN PATENT DOCUMENTS

CN   107484426 A   12/2017
CN   209822179 U   12/2019
(Continued)

*Primary Examiner* — Anthony Q Edwards
*Assistant Examiner* — Rashen E Morrison
(74) *Attorney, Agent, or Firm* — Rivka Friedman

(57) ABSTRACT

The present application provides a display module and a mobile terminal. The display module includes a display panel and a support layer. The display panel includes a first plane part, a second plane part and a bending part. The support layer is located between the first plane part and the second plane part. The support layer includes a first support part and a second support part. The second plane part corresponds to the second support part. In a light-emitting direction of the display panel, a thickness of the first support part is greater than a thickness of the second support part.

20 Claims, 4 Drawing Sheets

(56) References Cited

U.S. PATENT DOCUMENTS

| | | | |
|---|---|---|---|
| 11,711,456 B2* | 7/2023 | Han | G06F 1/1616 |
| | | | 455/575.3 |
| 2016/0129299 A1* | 5/2016 | Newman | A63B 21/4037 |
| | | | 482/142 |
| 2016/0172623 A1* | 6/2016 | Lee | H10K 50/84 |
| | | | 257/40 |
| 2017/0194580 A1* | 7/2017 | Lee | H10K 50/8445 |
| 2021/0125527 A1 | 4/2021 | Ni | |

FOREIGN PATENT DOCUMENTS

| | | | | |
|---|---|---|---|---|
| CN | 110708407 A | | 1/2020 | |
| CN | 112289185 A | * | 1/2021 | G09F 9/30 |
| CN | 112309248 A | | 2/2021 | |
| CN | 113764356 A | | 12/2021 | |
| CN | 113823196 A | | 12/2021 | |
| KR | 20200069527 A | | 6/2020 | |
| WO | WO-2023050460 A1 | * | 4/2023 | G06F 1/1656 |

* cited by examiner

DISPLAY MODULE AND MOBILE TERMINAL

BACKGROUND OF INVENTION

Field of Invention

The present application relates to a field of display technology, and particularly to a display module and a mobile terminal.

Description of Prior Art

Flexible display screens have bending performance, and widths of frames of the flexible display screens can be greatly reduced through a pad bending process. Wherein bending radii of binding ends can be reduced by reducing thicknesses of stack layers under flexible display panels to further reduce the widths of the frames of the flexible display screens.

However, bending performance of flexible display modules is closely related to thicknesses of stack layers, blindly reducing the thicknesses of the stack layers may cause strength of the flexible display modules to decline.

Current flexible display modules have a technical problem of reducing thicknesses of stack layers in order to realize narrow frames, resulting in declines of strength of the flexible display modules.

SUMMARY OF INVENTION

The present application provides a display module and a mobile terminal to improve the technical problem of reducing the strength of the current flexible display modules by thinning the thicknesses of the stack layers in order to achieve the narrow frames.

In order to solve the above technical problem, technical schemes provided in the present application are as follows:

The present application provides a display module, wherein the display module includes:
- a display panel, wherein the display panel includes a first plane part, a second plane part and a bending part, the bending part is located between the first plane part and the second plane part, and the second plane part is bent to a side of the display panel away from a light-emitting direction; and
- a support layer, wherein the support layer is located between the first plane part and the second plane part, the support layer includes a first support part and a second support part, and the second plane part corresponds to the second support part, wherein in the light-emitting direction of the display panel, a thickness of the first support part is greater than a thickness of the second support part.

In the display module of the present application, wherein a side of the first support part close to the first plane part is flush with a side of the second support part close to the first plane part.

In the display module of the present application, wherein the display module further includes a reinforcing layer disposed between the second support part and the second plane part.

In the display module of the present application, wherein the second plane part is disposed on the reinforcing layer.

In the display module of the present application, wherein an orthographic projection of the second plane part on the reinforcing layer is located in the reinforcing layer.

In the display module of the present application, wherein the first support part and the second support part are integrally formed.

In the display module of the present application, wherein the first support part and the second support part are detachably connected.

In the display module of the present application, wherein at least one of the first support part and the second support part is provided with a plurality of fixing slots, at least one of the first support part and the second support part is provided with a plurality of fixing keys corresponding to the fixing slots, and one of the fixing keys corresponds to one of the fixing slots.

In the display module of the present application, wherein the first support part is provided with the plurality of fixing slots, the second support part is provided with the plurality of fixing keys, and the fixing slots on the first support part correspond to the fixing keys on the second support part.

In the display module of the present application, wherein the first support part is provided with the plurality of fixing keys, the second support part is provided with the plurality of fixing slots, and the fixing keys on the first support part correspond to the fixing slots on the second support part.

In the display module of the present application, wherein the first support part and the second support part are provided with the plurality of fixing keys and the plurality of fixing slots, the fixing keys on the first support part correspond to the fixing slots on the second support part, and the fixing slots on the first support part correspond to the fixing keys on the second support part.

In the display module of the present application, wherein an orthographic projection of the reinforcing layer on the support layer is located in the second support part.

In the display module of the present application, wherein the first support part is spaced from the reinforcing layer.

In the display module of the present application, wherein a spacing between the first support part and the reinforcing layer is greater than a thickness of the first support part along the light-emitting direction of the display panel.

In the display module of the present application, wherein each of the fixing keys includes at least a first fixing part and a second fixing part connected with the first fixing part.

In the display module of the present application, wherein a shape or a size of the first fixing part is different from a shape or a size of the second fixing part.

In the display module of the present application, wherein in the light-emitting direction of the display panel, a ratio of a thickness of the second support part to a thickness of the first support part ranges from $1/5$ to $4/5$.

In the display module of the present application, wherein the plurality of fixing keys are arranged at equal intervals on the first support part or the second support part.

In the display module of the present application, wherein, in an arrangement direction of the plurality of fixing keys, a ratio of a spacing between the two adjacent fixing keys to a length of the first support part or the second support part ranges from $1/5$ to $1/3$.

The present application further provides a mobile terminal, wherein the mobile terminal includes a terminal body and the display module mentioned above, and the display module and the terminal body are combined as a whole.

By setting the support layer to include the first support part and the second support part, and making the thickness of the second support part less than the thickness of the first support part, a thickness of the support layer between the first plane part and the second plane part can be reduced, and a bending radius of the bending part of the display panel can be reduced, so as to achieve an effect of further reducing a width of a frame of the display module; moreover, since the present application only reduces the thickness of the second support part of the support layer close to the bending part, the first support part can still play a good supporting role for the display module to ensure a strength demand of the display module.

BRIEF DESCRIPTION OF DRAWINGS

In order to explain embodiments or technical solutions in prior arts clearly, the following will briefly introduce drawings needed to be used in description of the embodiments or the prior arts. The drawings in the following description are only some embodiments of the invention. For those skilled in the art, other drawings can further be obtained from these drawings without paying creative labor.

DESCRIPTION OF REFERENCE MARKS

Figure 1:
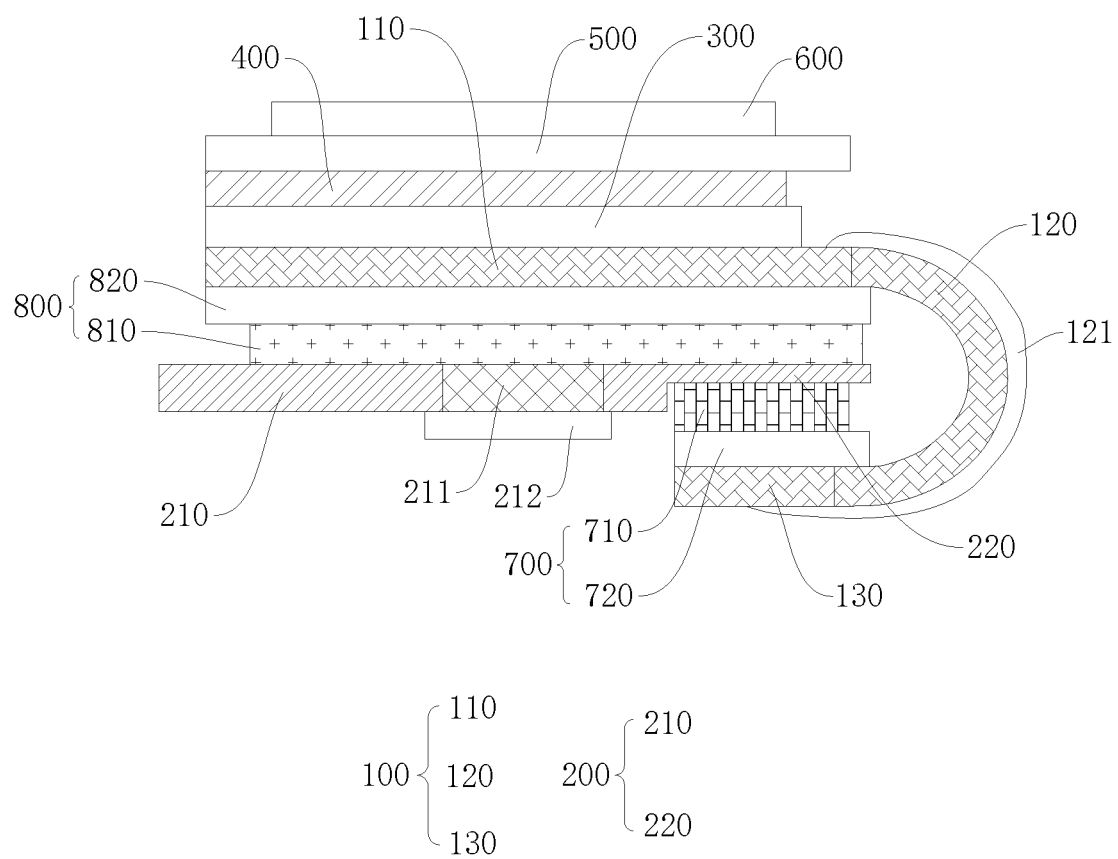
FIG. 1 is an overall schematic structural diagram of a display module of the present application.

A display panel 100, a first plane part 110, a bending part 120, a ultraviolet curing adhesive layer 121, a second plane part 130, a support layer 200, a first support part 210, a hollow part 211, a support tape 212, a second support part 220, fixing keys 230, a first fixing part 231, a second fixing part 232, fixing slots 240, a polarizing layer 300, an optical adhesive layer 400, a flexible cover plate layer 500, an anti-scratch layer 600, a reinforcing layer 700, a reinforcing plate 710, a second back plate 720, an intermediate film layer 800, a buffer layer 810, a first back plate 820, a support member 900, a first protective film layer 910, a second protective film layer 920, and a filling film layer 930.

DETAILED DESCRIPTION OF EMBODIMENTS

The technical scheme in the embodiment of the present application will be described clearly and completely below in combination with the accompanying drawings in the embodiment of the present application. Obviously, the described embodiments are only part of the embodiments of the present application, not all of the embodiments. Based on the embodiments in the present application, all other embodiments obtained by those skilled in the art without creative work belong to the scope of protection of the present application. In addition, it should be understood that the specific embodiments described herein are only used to illustrate and explain the present application and are not used to limit the present application. In the present application, in the absence of a contrary explanation, the location words used, such as "up" and "down", usually refer to the up and down under the actual use or working state of the device, specifically the drawing direction in the attached drawings; The "inside" and "outside" are for the contour of the device.

Flexible display screens have bending performance, and widths of frames of the flexible display screens can be greatly reduced through a pad bending process. Wherein bending radii of binding ends can be reduced by reducing thicknesses of stack layers under flexible display panels to further reduce the widths of the frames of the flexible display screens.

However, bending performance of flexible display modules is closely related to thicknesses of stack layers, blindly reducing the thickness of the thicknesses of the stack layers may cause strength of the flexible display modules to decline and bonding bubbles of the stack layers. The present application proposes following schemes based on the above technical problems.

Referring to FIG. 1 to FIG. 7, the present application provides a display module, wherein the display module includes a display panel 100 and a support layer 200. The display panel 100 includes a first plane part 110, a second plane part 130 and a bending part 120, the bending part 120 is located between the first plane part 110 and the second plane part 130, and the second plane part 130 is bent to a side of the display panel 100 away from a light-emitting direction; the support layer 200 is located between the first plane part 110 and the second plane part 130, the support layer 200 includes a first support part 210 and a second support part 220, and the second plane part 130 corresponds to the second support part 220, wherein in the light-emitting direction of the display panel 100, a thickness of the first support part 210 is greater than a thickness of the second support part 220.

The present embodiment sets the support layer 200 to include the first support part 210 and the second support part 220, and makes the thickness of the second support part 220 less than the thickness of the first support part 210, which can reduce a thickness of the support layer 200 between the first plane part 110 and the second plane part 130, and then reduce a bending radius of the bending part 120 of the display panel 100 to achieve an effect of further reducing a width of a frame of the display module; moreover, since the present application only reduces the thickness of the second support part 220 of the support layer 200 close to the bending part 120, the first support part 210 can still play a good supporting role for the display module to ensure a strength demand of the display module, and effectively reduce bad bonding bubbles and other defects caused by a small thickness of the support layer 200, which can further improve quality stability of the display module.

Technical schemes of the present application are described in combination with specific embodiments. It should be noted that an order of descriptions of the following embodiments is not a limitation on a preferred order of the embodiments.

In the display module of the present application, the display panel 100 is a flexible and foldable panel, such as an organic light-emitting diode (OLED) display panel, a mini light-emitting diode (Mini LED) display panel, and a micro light-emitting diode (Micro LED) display panel, etc.

In the present embodiment, the first plane part 110 is a main part of the display panel 100 for display, and the bending part 120 and the second plane part 130 constitute a binding terminal part of the display panel 100. The bending part 120 can be provided with an ultraviolet curing adhesive layer 121, the binding terminal part bends to one side away from the light-emitting direction of the first plane part 110, and is connected to electrical components such as a driving chip (not shown in drawings) and a flexible circuit board (not shown in the drawings) of the display module on one side away from the light-emitting direction of the first plane part 110.

In the present embodiment, the support layer 200 is a rigid structural layer disposed on one side of the first plane part 110 away from the light-emitting direction, thereby playing a good and stable support role for film layers in the display module and improving a structural strength of the display module.

In the present embodiment, a correspondence between the second plane part 130 and the second support part 220 can be understood as: the second plane part 130 is disposed on one side of the first plane part 110 away from the light-emitting direction, a position of the second plane part 130 corresponds to a position of the second support part 220, and the second plane part 130 can be connected to the second support part 220 by disposing other film layers.

Referring to FIG. 1, FIG. 1 is an overall schematic structural diagram of the display module of the present application. In the display module of the present application, the display module can further include a polarizing layer 300 disposed on a light-emitting surface of the first plane part 110 of the display panel 100, an optical adhesive layer 400 disposed on the polarizing layer 300, a flexible cover layer 500 disposed on the optical adhesive layer 400, and an anti-scratch layer 600 disposed on the flexible cover layer 500.

In the present embodiment, the polarizing layer 300 can be composed of a polyvinyl alcohol (PVA) material layer, a cellulose triacetate (TAC) material layer, a pressure-sensitive adhesive layer, a release film layer, and a protective film layer.

In the present embodiment, the flexible cover layer 500 can be a flexible glass cover.

In the present embodiment, the support layer 200 can be made of materials with high strength, such as metal or alloy. Preferably, the support layer 200 can be made of stainless-steel materials, such as stainless-steel sheets, etc.

Figure 6:
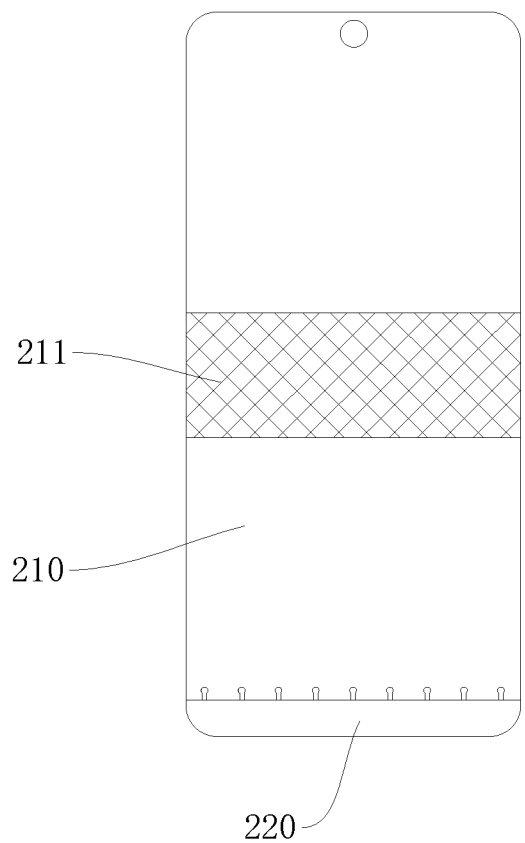
FIG. 6 is a plane schematic structural diagram of the support layer of the present application.

Referring to FIG. 1 and FIG. 6, in the present embodiment, the display module can be a foldable flexible display module, the first support part 210 is provided with a hollow part 211, wherein the hollow part 211 can be prepared by patterning, and the flexible display module can be folded in an area where the hollow part 211 is located. In order to improve bending resistance of the hollow part 211, a support tape 212 can be disposed on one side of the hollow part 211 away from the display panel 100, and the support tape 212 covers the hollow part 211.

Referring to FIG. 1, in the display module of the present application, one side of the first support part 210 close to the first plane part 110 is flush with one side of the second support part 220 close to the first plane part 110.

Through the above arrangement, on the one hand, one side of the first support part 210 close to the first plane part 110 and one side of the second support part 220 close to the first plane part 110 can be kept flat, which is convenient for compounding other film layers and the display panel 100; on the other hand, since the thickness of the second support 220 is less than the thickness of the first support 210, there is a segment difference between one side of the second support 220 close to the second plane 130 and one side of the first support 210 close to the second plane 130, thus, the film layers of the display module can be arranged by utilizing space of the segment difference formed by thinning the second support 220, thereby reducing thicknesses of the film layers between the second support 220 and the second plane 130, and reducing the bending radius of the bending part 120 of the display module to reduce the width of the frame of the display module.

Referring to FIG. 1, in the display module of the present application, the display module can further include a reinforcing layer 700 disposed between the second support part 220 and the second plane part 130, and the second plane part 130 is disposed on the reinforcing layer 700. In the present embodiment, by disposing a reinforcing layer 700 between the second support part 220 and the second plane part 130, the structural strength of the display module can be further improved on the basis of the support layer 200, especially the bending structural stability of the binding terminal part of the display panel 100.

In the present embodiment, an orthographic projection of the second plane part 130 on the reinforcing layer 700 is located in the reinforcing layer 700, so that the reinforcing layer 700 can play a more sufficient supporting role for the second plane part 130 and further improve the bending structural stability of the binding terminal part of the display panel 100.

Referring to FIG. 1, in the present embodiment, the display module can further include an intermediate film layer 800 disposed between the second support part 220 and the first plane part 110. Wherein the intermediate film layer 800 can include a buffer layer 810 disposed on one side of the support layer 200 close to the first plane part 110 and a first back plate 820 disposed on the buffer layer 810, and the first plane part 110 of the display panel 100 is located on the first back plate 820.

In the present embodiment, the buffer layer 810 can be made of foam materials, plastic materials, foam materials, or other materials with good cushioning properties. Materials of the first back plate 820 can include polyethylene terephthalate (PET), etc.

In the present embodiment, the reinforcing layer 700 can include a reinforcing plate 710 disposed on one side of the second support part 220 close to the second plane part 130 and a second back plate 720 disposed on the reinforcing plate 710. An orthographic projection of the reinforcing plate 710 on the second back plate 720 can all be located in the second back plate 720.

In the present embodiment, one side of the second back plate 720 close to the bending part 120 of the display panel 100 can extend to protrude from the reinforcing plate 710, which can play a better protective role for a junction position between the bending part 120 and the second plane part 130, thereby reducing risks of line breakages at the junction position.

In the present embodiment, the reinforcing plate 710 can be made of polyimide material (PI), polyethylene terephthalate material (PET), copper clad laminate material, aluminum sheet, or steel sheet, etc. The second back plate 720 can be made of the same materials as the materials of the first back plate 820, such as polyethylene terephthalate (PET), etc.

Referring to FIG. 2 to FIG. 5, in the display module of the present application, the first support part 210 and the second support part 220 can be integrally formed by cutting and grinding to maintain an overall structural stability of the support layer 200.

In the present embodiment, the first support part 210 and the second support part 220 can be detachably connected to facilitate an adaptive adjustment of the thickness of the second support part 220, thereby meeting requirements of a variety of display modules of different specifications. Moreover, since the second support part 220 and the first support part 210 are detachably connected, they can be manufactured independently and then assembled, thus, a manufacturing process of the first support part 210 and a manufacturing process of the second support part 220 will not affect or interfere with each other, so that a dimensional accuracy of the first support part 210 and a dimensional accuracy of the second support part 220 can be improved.

Figure 2:
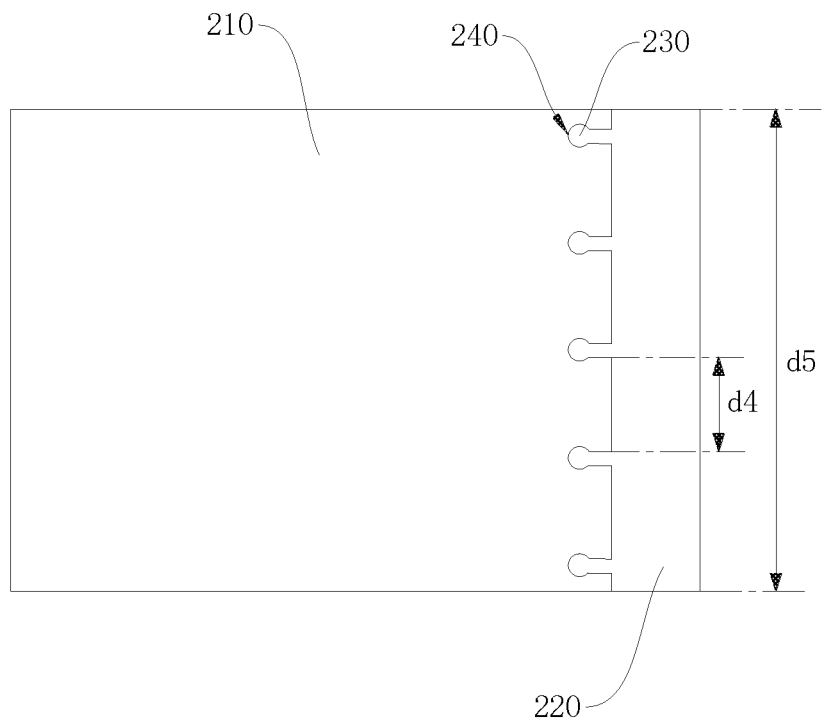
FIG. 2 is a first schematic structural diagram of a support layer of the present application.
Figure 3:
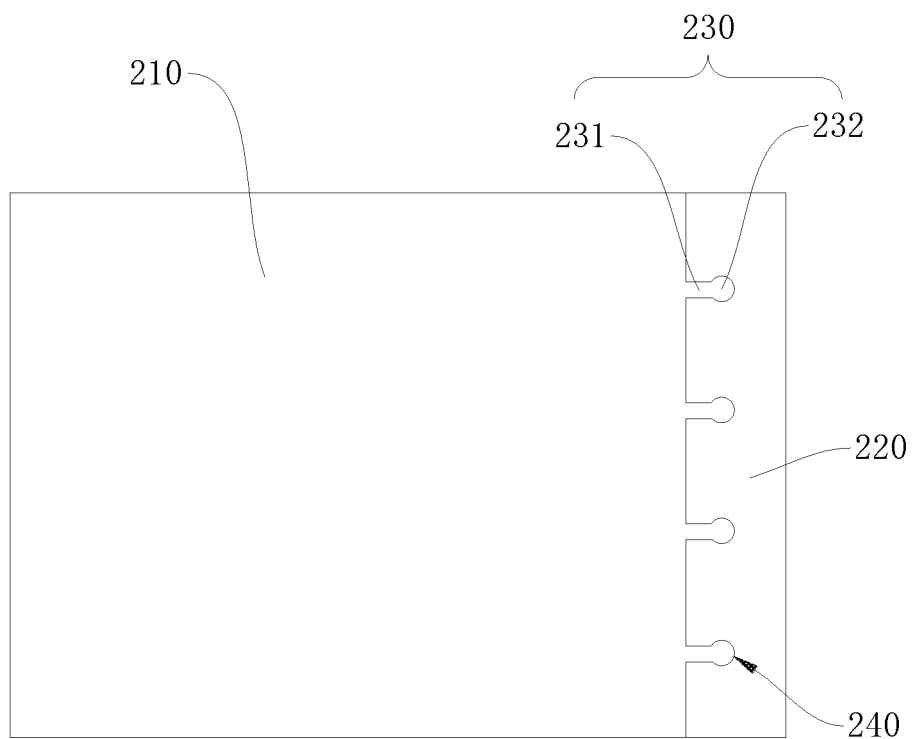
FIG. 3 is a second schematic structural diagram of the support layer of the present application.
Figure 4:
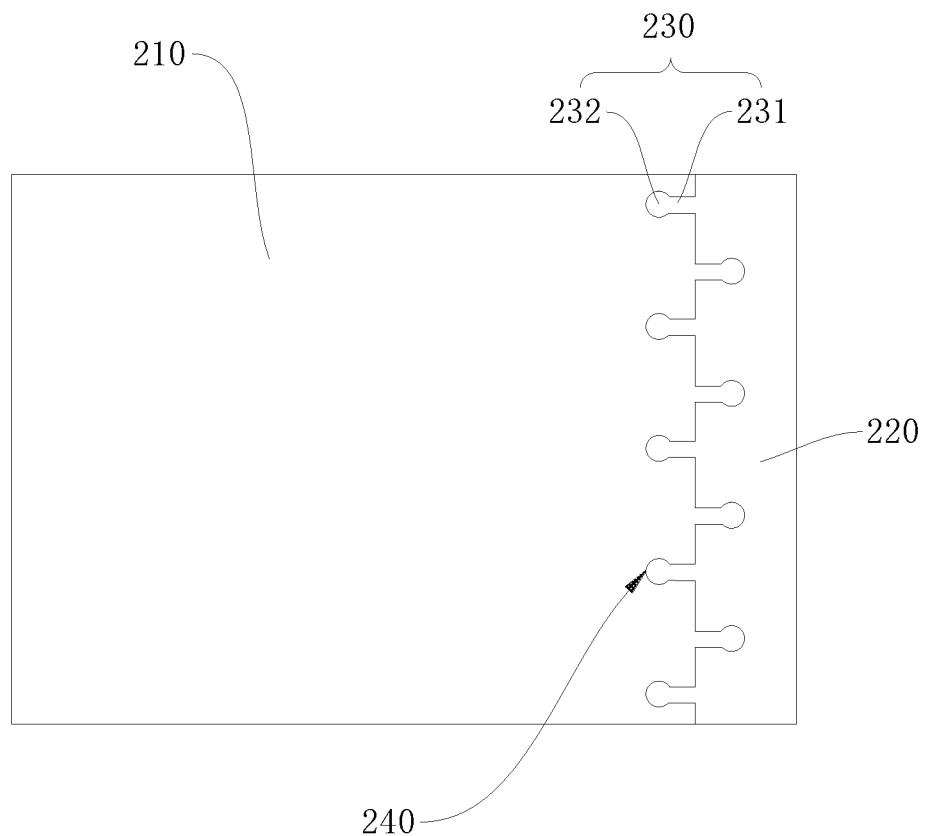
FIG. 4 is a third schematic structural diagram of the support layer of the present application.

Referring to FIG. 2 to FIG. 4, in the present embodiment, at least one of the first support part 210 and the second support part 220 is provided with a plurality of fixing slots 240, at least one of the first support part 210 and the second support part 220 is provided with a plurality of fixing keys 230 corresponding to the fixing slots 240, and one of the fixing keys 230 corresponds to one of the fixing slots 240.

For example, referring to FIG. 2, FIG. 2 is a first schematic structural diagram of the support layer of the present application. Wherein the first support part 210 is provided with the plurality of fixing slots 240 close to an edge of the second support part 220, and the second support part 220 is provided with the plurality of fixing keys 230 close to an edge of the first support part 210, the fixing keys 230 protrude from the second support 220 in a direction from the second support 220 to the first support 210, and the fixing keys 230 are embedded in the fixing slots 240.

For another example, referring to FIG. 3, FIG. 3 is a second schematic structural diagram of the support layer of the present application. Wherein the first support part 210 is provided with the plurality of fixing keys 230 close to the edge of the second support part 220, and the second support part 220 is provided with the plurality of fixing slots 240 close to the edge of the first support part 210, the fixing keys 230 protrude from the first support part 210 in a direction from the first support part 210 to the second support part 220, and the fixing keys 230 are embedded in the fixing slots 240.

For another example, referring to FIG. 4, FIG. 4 is a third schematic structural diagram of the support layer of the present application. Wherein the plurality of fixing keys 230 and the plurality of fixing slots 240 are disposed at the edge of the first support part 210 close to the second support part 220 and the edge of the second support part 220 close to the first support part 210. The fixing keys 230 on the first support part 210 correspond to the fixing slots 240 on the second support part 220 one by one, the fixing slots 240 on the first support part 210 correspond to the fixing keys 230 on the second support part 220 one by one, and one of the fixing keys 230 is embedded in one of the fixing slots 240.

It should be noted that whether the fixing keys 230 are disposed on the first support part 210 or the second support part 220, the fixing keys 230 are integrally formed with the first support part 210 or the second support part 220 to improve connection strength between the fixing keys 230 and the first support part 210 or the second support part 220.

Figure 5:
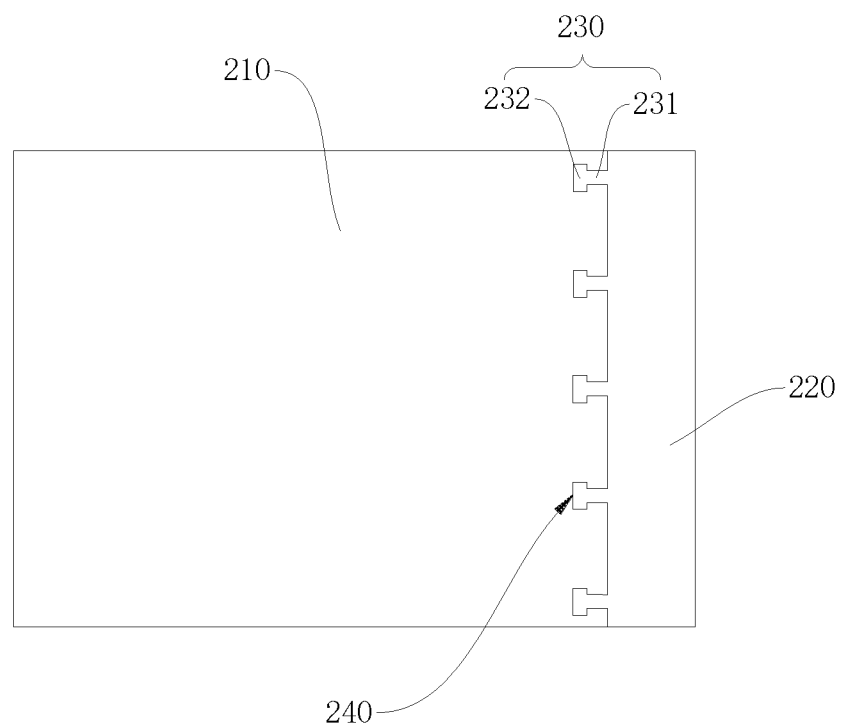
FIG. 5 is a fourth schematic structural diagram of the support layer of the present application.

Referring to FIG. 3 to FIG. 5, in the display module of the present application, the fixing keys 230 include at least a first fixing part 231 and a second fixing part 232 connected with the first fixing part 231. A shape or a size of the first fixing part 231 is different from a shape or a size of of the second fixing part 232, thereby making a fitting between the fixing keys 230 and the fixing slots 240 more firm.

In the present embodiment, as shown in FIG. 3, the first fixing part 231 can be connected to the first support part 210 or a main part of the second support part 220, and the second fixing part 232 can be connected to one end of the first fixing part 231 away from the main part of the first support part 210 or the main part of the second support part 220.

In the present embodiment, the size of the second fixing part 232 can be larger than the size of the first fixing part 231, so that the fixing keys 230 are not easy to separate from the fixing slots 240, which can improve a bonding stability.

In the present embodiment, as shown in FIG. 4, a plane shape of the first fixing part 231 can be a rectangular, a plane shape of the second fixing part 232 can be a circular, and a diameter of the circular of the second fixing part 232 is greater than a width of a connection position between the first fixing part 231 and the second fixing part 232.

In the present embodiment, as shown in FIG. 5, the plane shape of the first fixing part 231 can be the rectangular, and the plane shape of the second fixing part 232 can further be the rectangular, and a width of the second fixing part 232 is greater than a width of the first fixing part 231 in a connection direction perpendicular to the first fixing part 231 and the second fixing part 232.

It should be noted that the shape of the first fixing part 231 and the shape of the second fixing part 232 can further be a trapezoidal, a diamond, a triangle, or other shapes. The present embodiment is only an example and does not limit specific shapes.

Figure 7:
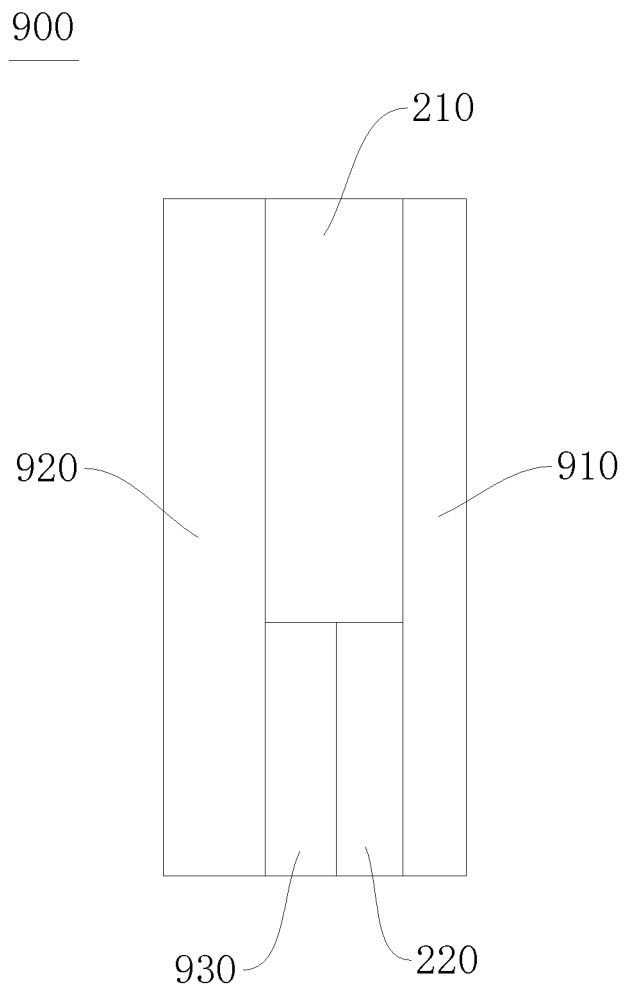
FIG. 7 is a schematic structural diagram of film layers of a support member of the present application.

Referring to FIG. 7, FIG. 7 is a schematic structural diagram of film layers of a support member 900 of the present application. In the display module of the present application, the support layer 200 can form the independent support member 900 by covering protective film layers on both sides and save it in this form. Before compounding with the display panel 100 and other film layers, by tearing off the protective film layers in the support member 900, the support layer 200 can be compounded with the display panel 100 and the other film layers.

Specifically, as shown in FIG. 7, the support member 900 can include the support layer 200, a first protective film layer 910 and a second protective film layer 920 respectively disposed on both sides of the support layer 200, and a filling film layer 930 disposed between the first protective film layer 910 and the second protective film layer 920.

The first protective film layer 910 is compounded on a surface flush with the first support part 210 and the second support part 220, and the first protective film layer 910 completely covers the flush surface. The second protective film layer 920 is compounded on a surface of the first support part 210 away from the first protective film layer 910, and the second protective film layer 920 can be disposed directly opposite to the first protective film layer 910, wherein an area of the second protective film layer 920 can be the same as an area of the first protective film layer 910. The filling film layer 930 can be disposed in a segment difference space between the second protective film layer 920 and the second support 220 to fill the segment difference space, thereby improving a protection effect of the support layer 200.

In the display module of the present application, a manufacturing method of the support member 900 can include following steps:

S100, cutting a steel plate to form a first plate and a second plate respectively.

S200, etching the first plate and the second plate respectively for the first time to form a first support plate with a specific thickness and a second support plate with a specific thickness.

S300, etching the first support plate and the second support plate respectively for the second time to form the fixing keys 230 or the fixing slots 240 on the edge of the first support part 210 and on the edge of the second support part 220.

S400, compounding the first protective film layer 910 on one side of the first support part 210.

S500, aligning the fixing keys 230 or the fixing slots 240 on the first support part 210 with the fixing slots 240 or the fixing keys 230 on the second support part 220, and then compounding the second support part 220 on the first protective film layer 910.

S600, coating adhesive on the second support 220 to form a glue free filling film to fill the segment difference between the first support 210 and the second support 220.

S700, compounding the second protective film layer 920 on a surface of the first support part 210 and a surface of the glue free filling film, and then defoaming to make the support member 900.

In the present embodiment, when the support layer 200 composed of the first support part 210 and the second support part 220 needs to be compounded with the display panel 100, the first protective film layer 910, the second protective film layer 920 and the glue free filling film can be torn off to expose the support layer 200, and then the support layer 200 can be compounded with the display panel 100.

Figure 8:
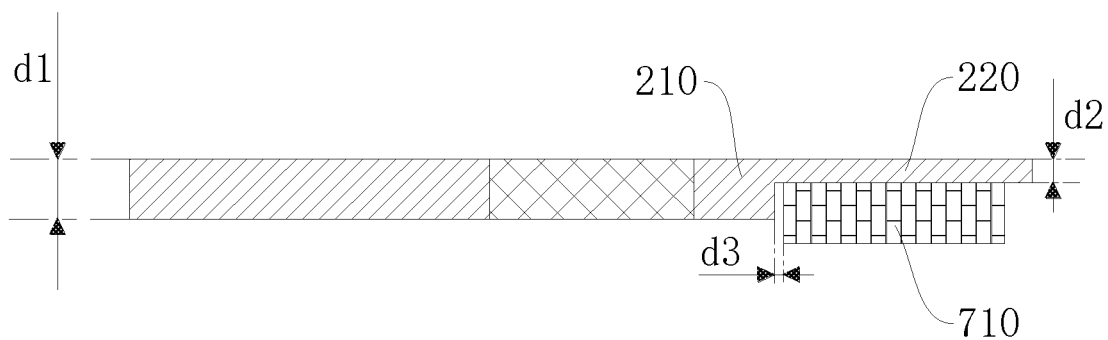
FIG. 8 is a schematic structural diagram of a positional relationship between the support layer and a reinforcing plate of the present application.

Referring to FIG. 8, FIG. 8 is a schematic structural diagram of a positional relationship between the support layer 200 and the reinforcing plate 710 in the present application. In the display module of the present application, an orthographic projection of the reinforcing layer 700 on the support layer 200 is located in the second support part 220, so that the reinforcing layer 700 can make full use of the segment difference space reduced by the second support part 220, which can not only ensure that the reinforcing layer 700 can play a good structural strengthening effect on the binding terminal part of the display panel 100, but also avoid a spatial obstruction of the first support part 210 to the reinforcing layer 700 and reduce a material cost of the reinforcing layer 700.

In the present embodiment, the first support part 210 is spaced from the reinforcing layer 700.

In the present embodiment, a spacing d3 between the first support part 210 and the reinforcing layer 700 is greater than a thickness d1 of the first support part 210 along the light-emitting direction of the display panel 100, so that there is sufficient spacing between the reinforcing layer 700 and the connection position of the first support part 210 and the second support part 220, thereby avoiding affecting reinforcing performance of the reinforcing layer 700 due to a bonding of the reinforcing layer 700 to a splicing gap.

For example, in the present embodiment, the spacing d3 between the first support 210 and the reinforcing layer 700 ranges from 0.2 mm to 0.4 mm, and the thickness d1 of the first support 210 in the light-emitting direction of the display panel 100 ranges from 0.1 mm to 0.15 mm.

Referring to FIG. 8, in the display module of the present application, in the light-emitting direction of the display panel 100, a ratio of a thickness d2 of the second support 220 to the thickness d1 of the first support 210 ranges from 1/5 to 4/5, so as to maintain a relatively appropriate thickness ratio between the first support 210 and the second support 220, which can not only meet a strength requirement, but also reduce a film thickness of the binding end better, thereby reducing the width of the frame of the display module.

For example, in the present embodiment, in the light-emitting direction of the display panel 100, the thickness d1 of the first support 210 ranges from 0.1 mm to 0.15 mm, and the thickness d2 of the second support 220 ranges from 0.03 mm to 0.08 mm.

Referring to FIG. 2, in the display module of the present application, the plurality of fixing keys 230 are disposed at equal intervals on the first support 210 or the second support 220, wherein in an arrangement direction of the plurality of fixing keys 230, a ratio of a spacing d4 of the adjacent two fixing keys 230 to a length d5 of the first support 210 or the second support 220 ranges from 1/5 to 1/3, so that the first support part 210 and the second support part 220 can be connected through appropriate numbers of the fixing keys 230 and the fixing slots 240, which can not only improve the connection strength between the first support part 210 and the second support part 220, but also ensure that stress is uniform everywhere at the connection position and is not easy to produce a stress concentration phenomenon.

The present embodiment of the present application further provides a mobile terminal, which includes a terminal body and the display module, and the display module and the terminal body are combined as a whole. In the present embodiment, the mobile terminal can be an intelligent electronic display device such as a mobile phone, a computer, a TV, and a watch, etc.

The present embodiment sets the support layer 200 to include the first support part 210 and the second support part 220, and makes the thickness of the second support part 220 less than the thickness of the first support part 210, which can reduce the thickness of the support layer 200 between the first plane part 110 and the second plane part 130, and then reduce the bending radius of the bending part 120 of the display panel 100 to achieve the effect of further reducing the width of the frame of the display module. Through the above scheme, the bending radius of the bending part 120 of the display module can be reduced from 0.32 mm to 0.25 mm. Moreover, since the present application only reduces the thickness of the second support part 220 of the support layer 200 close to the bending part 120, the first support part 210 can still play a good supporting role for the display module to ensure the strength demand of the display module, and effectively reduce the bad bonding bubbles and other defects caused by the small thickness of the support layer 200, which can further improve the quality stability of the display module.

The above describes the display module and the mobile terminal provided by the embodiments of the present application in detail. In this paper, specific examples are applied to explain a principle and implementation modes of the present application. The descriptions of the above embodiments are only used to help understand a method and a core idea of the present application; meanwhile, for those skilled in the art, there will be changes in the specific implementation modes and an application scope according to the idea of the present application. In conclusion, contents of the specification should not be understood as restrictions on the present application.

What is claimed is:

1. A display module comprising:
   a display panel, wherein the display panel comprises a first plane part, a second plane part, and a bending part, the bending part is located between the first plane part and the second plane part, and the second plane part is bent to a side of the display panel away from a light-emitting direction;
   a support layer, wherein the support layer is located between the first plane part and the second plane part, the support layer comprises a first support part and a second support part, both of the first support part and the second support part correspond to the first plane part, the first support part is disposed at a side of the second support part away from the bending part, and the second plane part corresponds to the second support part; and a reinforcing layer disposed between the second support part and the second plane part;

wherein in the light-emitting direction of the display panel, a thickness of the first support part is greater than a thickness of the second support part; and a gap is formed between a side surface of the reinforcing layer close to the first plane part and the second plane part.

2. The display module according to claim 1, wherein a side of the first support part close to the first plane part is flush with a side of the second support part close to the first plane part.

3. The display module according to claim 1, wherein the second plane part is disposed on the reinforcing layer.

4. The display module according to claim 3, wherein an orthographic projection of the second plane part on the reinforcing layer is located in the reinforcing layer.

5. The display module according to claim 3, wherein the first support part and the second support part are integrally formed.

6. The display module according to claim 4, wherein the first support part and the second support part are detachably connected.

7. The display module according to claim 6, wherein at least one of the first support part and the second support part is provided with a plurality of fixing slots, at least one of the first support part and the second support part is provided with a plurality of fixing keys corresponding to the fixing slots, and one of the fixing keys corresponds to one of the fixing slots.

8. The display module according to claim 7, wherein the first support part is provided with the plurality of fixing slots, the second support part is provided with the plurality of fixing keys, and the fixing slots on the first support part correspond to the fixing keys on the second support part.

9. The display module according to claim 7, wherein the first support part is provided with the plurality of fixing keys, the second support part is provided with the plurality of fixing slots, and the fixing keys on the first support part correspond to the fixing slots on the second support part.

10. The display module according to claim 7, wherein the first support part and the second support part are provided with the plurality of fixing keys and the plurality of fixing slots, the fixing keys on the first support part correspond to the fixing slots on the second support part, and the fixing slots on the first support part correspond to the fixing keys on the second support part.

11. The display module according to claim 7, wherein an orthographic projection of the reinforcing layer on the support layer is located in the second support part.

12. The display module according to claim 11, wherein the first support part is spaced from the reinforcing layer.

13. The display module according to claim 12, wherein a spacing between the first support part and the reinforcing layer is greater than a thickness of the first support part along the light-emitting direction of the display panel.

14. The display module according to claim 7, wherein each of the fixing keys comprises at least a first fixing part and a second fixing part connected with the first fixing part.

15. The display module according to claim 14, wherein a shape or a size of the first fixing part is different from a shape or a size of the second fixing part.

16. The display module according to claim 1, wherein in the light-emitting direction of the display panel, a ratio of a thickness of the second support part to a thickness of the first support part ranges from $1/5$ to $4/5$.

17. The display module according to claim 7, wherein the plurality of fixing keys are arranged at equal intervals on the first support part or the second support part.

18. The display module according to claim 17, wherein, in an arrangement direction of the plurality of fixing keys, a ratio of a spacing between the two adjacent fixing keys to a length of the first support part or the second support part ranges from $1/5$ to $1/3$.

19. A mobile terminal, wherein the mobile terminal comprises a terminal body and a display module, and the display module and the terminal body are combined as a whole, wherein the display module comprises:

a display panel, wherein the display panel comprises a first plane part, a second plane part, and a bending part, the bending part is located between the first plane part and the second plane part, and the second plane part is bent to a side of the display panel away from a light-emitting direction;

a support layer, wherein the support layer is located between the first plane part and the second plane part, the support layer comprises a first support part and a second support part, both of the first support part and the second support part correspond to the first plane part, the first support part is disposed at a side of the second support part away from the bending part, and the second plane part corresponds to the second support part part; and a reinforcing layer disposed between the second support part and the second plane part;

wherein in the light-emitting direction of the display panel, a thickness of the first support part is greater than a thickness of the second support part; and a gap is formed between a side surface of the reinforcing layer close to the first plane part and the second plane part.

20. The display module according to claim 1, wherein at least one of the first support part and the second support part is provided with a plurality of fixing slots, another one of the first support part and the second support part is provided with a plurality of fixing keys corresponding to the fixing slots;

wherein one of the fixing keys comprises a first fixing part and a second fixing part connected to the first fixing part, the first fixing part is connected to the first support part or a main part of the second support part, and the second fixing part is connected to one end of the first fixing part away from the main part of the first support part or the main part of the second support part;

wherein a plane shape of the first fixing part is rectangle, a plane shape of the second fixing part is circle, and a diameter of the circle of the second fixing part is greater than a width of a connection position between the first fixing part and the second fixing part; or, both a plane shape of the first fixing part and a plane shape of the second fixing part are rectangle, and a width of the second fixing part is greater than a width of the first fixing part in a connection direction perpendicular to the first fixing part and the second fixing part.

* * * * *